United States Patent Office 3,346,920
Patented Oct. 17, 1967

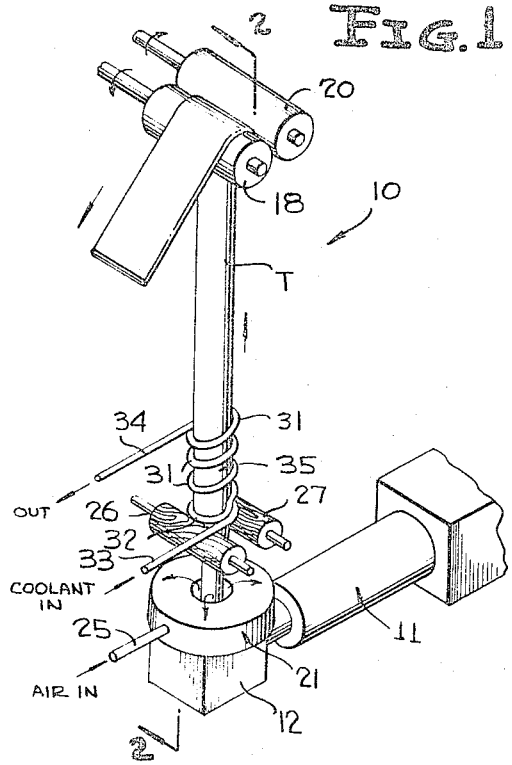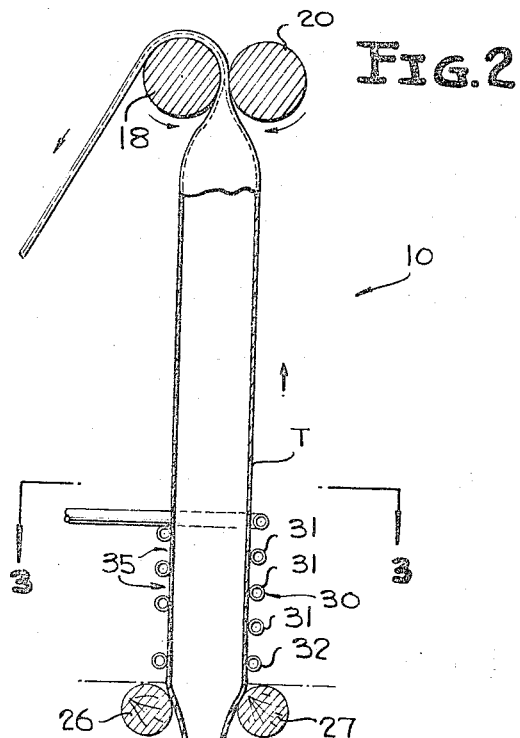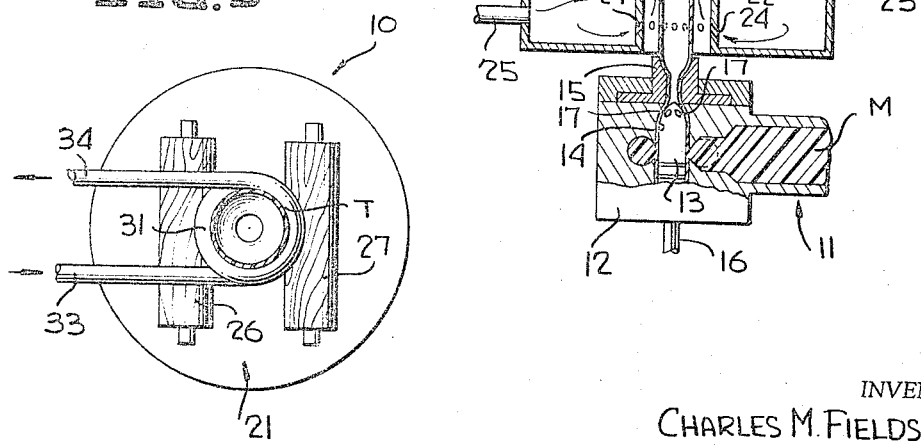
INVENTOR
CHARLES M. FIELDS

3,346,920
EXTERNAL COOLING DEVICE FOR
EXTRUDED TUBING
Charles M. Fields, La Grange, Ill., assignor to Continental Can Company, Inc., New York, N.Y., a corporation of New York
Filed Nov. 26, 1963, Ser. No. 326,121
7 Claims. (Cl. 18—14)

This invention relates to a novel method of and apparatus for cooling and sizing extruded tubing by conveying relatively thin-walled plastic tubing through a spiral cooling coil formed by a plurality of spaced convolutions which establish an unbroken surface for continuously contacting and cooling exterior wall portions of the tubing along an unbroken line as the tubing is conveyed through the spiral cooling coil.

Conventional plastic tubing is extruded, cooled and sized in a variety of different ways by diverse conventional apparatus. For example, relatively thick or heavy walled extruded plastic tubing is conventionally cooled by transporting the hot tubing through a cylindrical cooling sleeve which has an internal wall diameter substantially equal to the desired external diameter of the finally formed tubing. A suitable coolant is introduced into, circulated through and withdrawn from an interior chamber of the cooling sleeve. As the hot extruded tubing is transported through the cooling sleeve, the tubing is pneumatically expanded in a well known manner and the exterior wall of the tubing conforms to the interior wall of the cooling sleeve. The hot tubing is progressively cooled by conduction during its passage through the cooling sleeve, and when the tubing is withdrawn from the cooling sleeve, the external diameter of the tubing is substantially equal to the internal wall diameter of the cooling sleeve.

It will be readily apparent that conventional devices for cooling and sizing extruded tubing, such as cylindrical cooling sleeves described above, have numerous inherent disadvantages. For example, while relatively heavy walled, extruded, plastic tubing can be cooled and sized by such conventional cooling sleeves, relatively thin-walled plastic tubing or film (approximately 5 mils or less in wall thickness) cannot be uniformly cooled and accurately sized at relatively high production rates by such conventional cooling sleeves. Both relatively thick and thin-walled plastic tubing has a tendency to drag on the interior wall or surface of conventional cooling sleeves. However, in the case of relatively thin-walled tubing or film which is relatively weak at conventionally elevated extruding temperatures, this drag between the relatively thin tubing and the interior wall of the cooling sleeve causes discontinuities and rupturing of the thin-walled tubing or film.

Chattering of the thin-walled tubing or film also occurs during the passage thereof through the conventional cooling sleeve because of forces setup during the elastic elongation or stretching and recovery in the portion of the cooled tubing being continuously withdrawn from the cooling sleeve. This chattering sets off vibrations in the thin-walled tubing which prevents the formation of a smooth surface finish of the tubing and prevents uniform wall thickness of the tubing.

A further disadvantage of such conventional cooling sleeves, and a serious one especially where small diameter thin-wall tubing is concerned, is the necessity for very accurately controlling the pressure and volume of the medium introduced into the hot plastic tubing for expanding the tubing into intimate contact with the interior internal wall of the cooling sleeves to maintain uniform cooling about the entire circumference of the tubing. However, a pressure and volume in excess of that which would greatly increase the drag between the tubing and the cooling sleeve by creating a diameter of the tubing in excess of an entrance opening of the cooling sleeve must also be avoided.

This problem is further aggravated by the contraction or shrinkage of the hot plastic tubing as it is progressively cooled by the cooling sleeve. General purpose plastics, such as polyethylene, shrink approximately 3% between the time of extrusion and such time as they are cooled. During the cooling of the hot plastic tubing, the shrinkage thereof tends to prevent tubing from contacting the internal wall of the cooling sleeve and also has the tendency to draw portions contacting the internal wall of the sleeve out of contact with this wall. Since the only control of the diameter of the tubing during the passage of the tubing through the cooling sleeve is the internal wall of the cooling sleeve, all such losses of contact between the tubing and the internal wall of the sleeve adversely effect the final diameter and wall thickness of the tubing.

It is, therefore, an object of this invention to eliminate the disadvantages inherent in conventional cooling and sizing devices of the type above-described by conveying a relatively thin-walled plastic tubing through a spiral cooling coil having a plurality of axially spaced convolutions providing an area for relief between the convolutions in which the hot plastic tubing may expand and simultaneously decrease drag between the spiral cooling coil and the tubing because of the limited contact between the convolutions and the plastic tubing.

Another object of this invention is to provide novel apparatus for cooling and sizing relatively thin-walled plastic tubing including means for extruding relatively thin-walled plastic tubing, means for conveying the tubing along a predetermined path, means adjacent the predetermined path for cooling and sizing the extruded tubing, the cooling and sizing means including a helical cooling coil formed by a plurality of spaced convolutions, and at least one of the convolutions being in a plane normal to the predetermined path established by the conveying means to insure uniform circumferential cooling of the tubing.

Still another object of this invention is to provide novel apparatus of the type immediately above-described, and in addition, to provide means between the extruding means and at least one of the convolutions to prevent vibration of the tubing as the tubing is conveyed by the conveying means along the predetermined path to insure a smooth exterior surface finish of the tubing.

A further object of this invention is to provide novel apparatus for cooling and sizing relatively thin-walled plastic tubing including means for extruding relatively thin-walled plastic tubing, means for conveying the tubing along a predetermined path, means adjacent the extruding means for directing coolant against exterior wall portions of the tubing, means adjacent the coolant directing means for further cooling and sizing the tubing, the cooling and sizing means being a spiral cooling coil, the cooling coil being formed by a plurality of spaced convolutions establishing an unbroken surface for continuously contacting exterior wall portions of tubing conveyed through the cooling coil, and at least one of the convolutions being arranged in a plane normal to the predetermined path of the cooling during the passage thereof through the spiral cooling coil.

A further object of this invention is to provide a novel method of cooling and sizing relatively thin-walled plastic tubing by performing the steps of at least transporting a relatively thin-walled plastic tubing along a predetermined path, pneumatically expanding the tubing while the tubing is being transported and cooling exterior helical wall portions of the tubing during the movement thereof along the predetermined path.

With the above, and other objects in view that will hereinafter appear, the nature of the invention will be more clearly understood by reference to the following detailed description, the appended claims and the several views illustrated in the accompanying drawings:

In the drawings:

FIGURE 1 is a perspective view of an apparatus constructed in accordance with this invention for cooling and sizing relatively thin-walled plastic tubing, and illustrates extruded tubing being drawn through a spiral cooling coil.

FIGURE 2 is an enlarged fragmentary sectional view taken along line 2—2 of FIGURE 1, and more clearly illustrates the various components of the apparatus of FIGURE 1, the limited area of contact between exterior wall portions of the tubing and convolutions of the spiral cooling coil, and a plurality of rollers for preventing chattering of the tubing during the passage thereof through the cooling coil.

FIGURE 3 is a transverse sectional view taken along line 3—3 of FIGURE 2, and more clearly illustrates the spiral cooling coil and rollers of FIGURE 2.

An apparatus or mechanism for cooling and sizing relatively thin-walled, plastic tubing is generally referred to by the reference numeral 10.

The apparatus 10 comprises a conventional extruder 11 terminating in a die 12. A core 13 is supported in a conventional manner in a cavity or chamber 14 of the die 12. An extrusion nozzle 15 of the die 12 is in axial alignment with the cavity 14 and the core 13.

Hot, flowable plastic material M, such as polyethylene, is extruded in a conventional manner by the extruder 11 into the die 12, and thereafter, extruded into a relatively thin-walled plastic tubing T.

During the extrusion of the thin-walled tubing T air from a suitable source of compressed air (not shown) is introduced into the interior of the tubing T by a conduit 16 opening into the core 13, which is conventionally of a hollow construction. The air so introduced into the interior of the core 13 flows through a plurality of openings or orifices 17 in the core 13 and is directed into the interior of the tubing T. The air so introduced into the interior of the tubing T gradually expands the tubing T radially outwardly as the tubing T is drawn or conveyed beyond the nozzle 15 by a pair of rolls 18, 20 supported a distance remote from the die 12 and driven in a conventional manner to convey the tubing T along a generally predetermined linear path between the nozzle 15 and the bight portions (unnumbered) of the rolls 18 and 20.

A substantially annular cooling chamber 21 is positioned adjacent the nozzle 15 of the die 12. The annular cooling chamber 21 includes an inner cylindrical wall 22 and an outer cylindrical wall 23. A plurality of circumferentially arranged openings or orifices 24 are formed in the inner cylindrical wall 22 of the annular chamber 21. The openings 24 are each angularly related with respect to the tubing T and the openings 24 each direct air introduced into the annular chamber 21 through a conduit 25 against exterior wall portions of the tubing T, as is best illustrated in FIGURE 2 of the drawings.

The tubing T is conveyed or drawn by the rolls 18 and 20 beyond the annular chamber 21 through a pair of rolls or rollers 26, 27 which are freely rotatably mounted in a conventional manner above the annular chamber 21 (as viewed in FIGURES 1 and 2) and in contact with the tubing T. The rollers 26, 27 are preferably constructed from wood and prevent vibration or chattering of the tubing T due to forces setup during elastic elongation and recovery in a portion of the tubing T being progressively drawn through a spiral cooling coil 30.

The spiral cooling coil 30 is supported in a conventional manner in axial alignment with the nozzle 15 of the die 12 and the annular cooling chamber 21. The spiral cooling coil 30 comprises a plurality of convolutions or spiral portions 31 which are substantially identical and are arranged to define a geometric helix. A lowermost convolution or spiral portion of the spiral cooling coil 30 adjacent the rolls 26 and 27 is arranged in a plane substantially normal to the axis of the tubing T and the predetermined linear path along which the tubing T is conveyed by the rolls 18 and 20. The purpose of the convolution or spiral portion 32 is to insure that the tubing T is uniformly cooled along the exterior circumferential wall portions thereof immediately upon the entry of the tubing T into the spiral cooling coil 30.

The convolutions 31 and 32 of the spiral cooling coil 30 establish an unbroken surface which continually contacts exterior wall portions of the tubing T along an unbroken, generally spiral or helical line between the initial entry of the tubing T between the convolution 32 and the final withdrawal of the tubing T from the cooling coil 30. This unbroken line of contact between the spiral cooling coil 30 and the tubing T substantially eliminates the drag between the exterior wall portions of the tubing T and the cooling coil 30, thereby substantially eliminating the tendency of the tubing T to rupture and the tendency of discontinuities to be formed in the tubing T. Thus, as the tubing T is drawn through the spiral cooling coil 30, coolant from a conventional source of supply (not shown) introduced into the coil 30 through a conduit 33 and withdrawn by a conduit 34 insures uniform conductive cooling of the tubing T and eliminates the formation of discontinuities therein by reducing to a minimum the drag between the convolutions 31 and 32 of the coil 30 and the exterior wall portions of the tubing T.

The tubing T is sized to a predetermined external diameter and wall thickness by the spiral cooling coil 30 and the air introduced into the interior of the tubing T through the openings 17 in the core 13 of the die 12 (FIGURE 2). The convolution 32 of the spiral cooling coil 30 which is normal to the axis of the tubing T has an internal diameter substantially identical to the desired external diameter of the tubing T. The plurality of convolutions or spiral portions 31 have an internal diameter slightly larger than the desired external diameter of the tubing T. However, these convolutions 31 are each angularly related with respect to the axis of the tubing T, and though they are of a diameter slightly in excess of the desired external diameter of the tubing T, the angular relationship of these convolutions 31 with respect to the axis of the tubing T establishes an effective diameter substantially equal to the desired external diameter of the tubing T in a manner clearly illustrated in FIGURE 2 of the drawings.

It should also be particularly noted that the convolutions 31 and 32 are spaced from one another to establish a spiral or helical area 35 extending substantially the entire axial length of the spiral cooling coil 30. This helical space formed by the axially spaced convolutions 31 and 32 provides a relief area into which portions of the tubing T may radially expand when the air pressure in the interior of the tubing T becomes excessive. That is, an excess of air pressure in the tubing T guarantees that firm contact is achieved between the exterior wall portions of the tubing T and the convolutions 31 and 32 of the spiral cooling coil 30 while preventing the tubing T from going completely oversize during the passage of the tubing T through the cooling coil 30. Since the tubing T is softest and more readily deformable adjacent the convolution 32 than when finally withdrawn from the spiral coil 30 at the last of the plurality of convolutions 31, the tubing T tends to expand to a greater extent adjacent the convolution 32 than adjacent the last of the convolutions 31. Any excess air pressure in the interior of the tubing T would therefore urge the tubing T radially outwardly a greater extent adjacent the convolutions 32 than at the last of the convolutions 31. This progressive lessening of the radially outward deformation of the tubing T due to the internal air pressure insures the formation of a substantially accurately dimensioned tubing at the point of withdrawal from the cooling coil 30 and yet permits expansion of the tubing T into the spiral relief area 35 prior to complete cooling and setting of the tubing T, thereby precluding rupture or oversizing of the tubing T.

Prior to the novel apparatus disclosed herein, tubing had been extruded at a speed of approximately thirty-two feet per minute employing a conventional cylindrical cooling sleeve of the type heretofore described. From a competitive standpoint, this speed of thirty-two feet per minute is substantially slow and the diameter of the tubing formed even at this relatively slow rate of speed deviated appreciably between desired limits and was found extremely difficult to control.

Apparatus constructed in accordance with this invention has been constructed and employed to manufacture the same tubing heretofore manufactured by conventional cooling sleeves. This apparatus, employing a helical or spiral cooling coil instead of the conventional cylindrical cooling sleeve, not only produced tubing of a more uniform diameter than that produced by conventional methods, but also increased the extrusion speed from thirty-two feet per minute to approximately seventy feet per minute. This increased uniformity in the diameter of the tubing, and the remarkably increased and totally unexpected increase in the production rate of the tubing is directly attributed to the spiral cooling coil 30 of this invention.

From the foregoing, it will be seen that novel and advantageous provision has been made for carrying out the desired end. However, attention is directed to the fact that variations may be made in the example method and apparatus disclosed herein without departing from the spirit and scope of the invention, as defined in the appended claims.

I claim:

1. Apparatus for cooling and sizing relatively thin-walled tubing comprising means for extruding relatively thin-walled tubing, means for conveying said tubing along a predetermined path, means adjacent said predetermined path for cooling and sizing the extruded tubing, said last-mentioned means comprising an imperforate spiral cooling coil having portions establishing an unbroken surface for continuously contacting exterior wall portions of the tubing transported through said spiral cooling coil.

2. Apparatus for cooling and sizing relatively thin-walled tubing comprising means for extruding relatively thin-walled tubing, means for conveying said tubing along a predetermined path, means adjacent said predetermined path for cooling and sizing the extruded tubing, said last-mentioned means comprising an imperforate spiral cooling coil, said imperforate spiral cooling coil including means for contacting exterior wall portions of tubing along an unbroken spiral line as the tubing is conveyed through the spiral cooling coil by said conveying means, said spiral cooling coil further defining spiral relief area means for facilitating expansion of said tubing radially outwardly beyond said spiral line of contact.

3. The apparatus as defined in claim 2 wherein said spiral cooling coil is formed by a plurality of spaced convolutions and at least one of said convolutions lies in a plane normal to the predetermined path established by said conveying means.

4. The apparatus as defined in claim 3 wherein said at least one convolution of said spiral cooling coil is nearest said extruding means whereby the tubing is uniformly cooled immediately after being extruded by said extruding means.

5. The apparatus as defined in claim 3 including means between said extruding means and said one convolution to prevent vibration of said tubing as the same is conveyed by said conveying means along said predetermined path.

6. The apparatus as defined in claim 5 wherein said means for preventing vibration of said tubing is a plurality of rollers.

7. Apparatus for cooling and sizing relatively thin-walled plastic tubing comprising means for extruding relatively thin-walled plastic tubing, means for conveying said tubing along a predetermined path, means adjacent said extruding means for directing coolant against exterior wall portions of said tubing, and means adjacent said coolant directing means for further cooling and sizing the tubing, said last-mentioned means being an imperforate spiral cooling coil, said spiral cooling coil being formed by a plurality of spaced convolutions establishing unbroken surface means for continuously contacting exterior wall portions of tubing conveyed through said cooling coil, and at least one of said convolutions being arranged in a plane normal to the predetermined path established by said conveying means.

References Cited

UNITED STATES PATENTS

| | | | |
|---|---|---|---|
| 2,461,975 | 2/1949 | Fuller | 18—14 |
| 2,631,332 | 3/1953 | Reber | 18—14 |
| 2,641,022 | 6/1953 | Kress | 18—14 |
| 2,947,032 | 8/1960 | Taylor | 18—14 |
| 3,008,186 | 11/1961 | Voigt | 18—14 |
| 3,074,108 | 1/1963 | Wiley et al. | 18—14 |
| 3,141,912 | 7/1964 | Goldman et al. | |
| 3,167,814 | 2/1965 | Corbett | 18—14 |
| 3,217,359 | 11/1965 | Euling | 18—14 |

WILLIAM J. STEPHENSON, *Primary Examiner.*